UNITED STATES PATENT OFFICE.

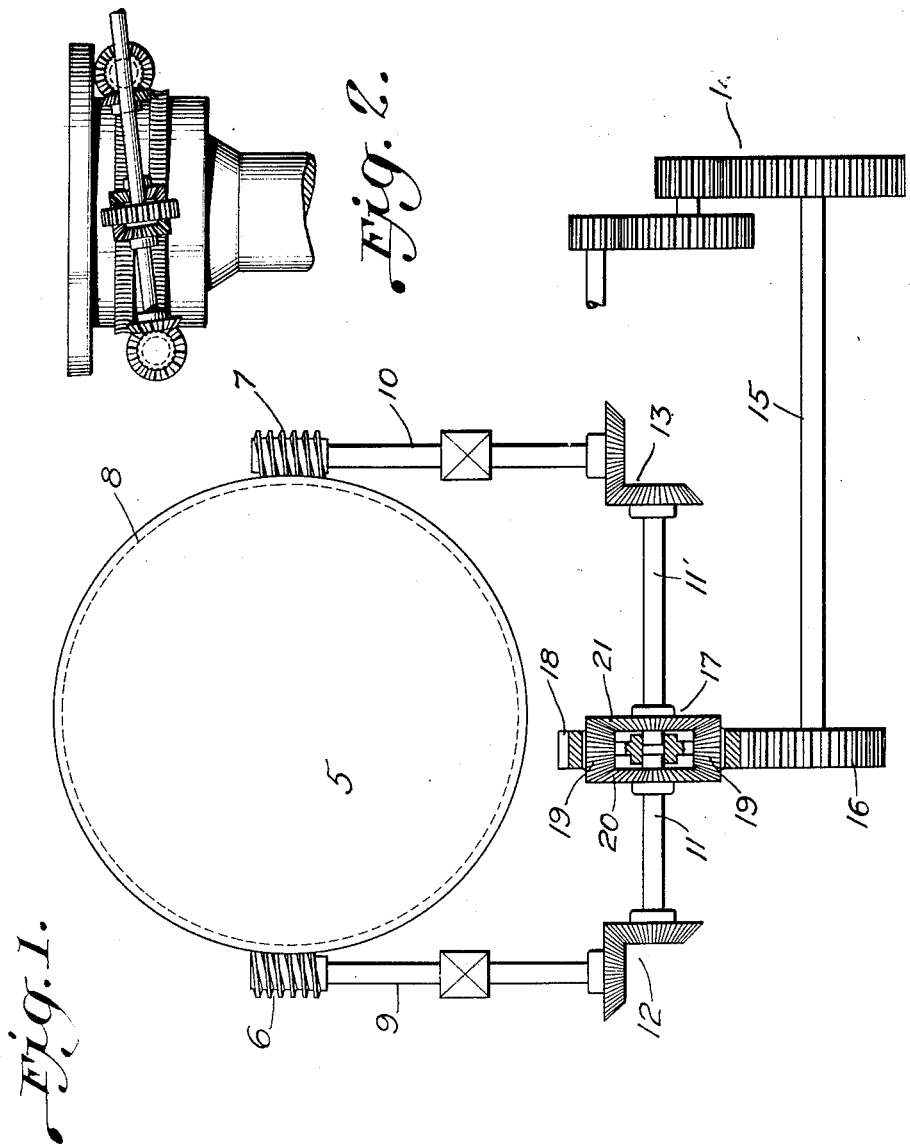

LEWIS J. EVANS, OF WILKINSBURG, PENNSYLVANIA, ASSIGNOR TO WESTINGHOUSE ELECTRIC & MANUFACTURING CO., A CORPORATION OF PENNSYLVANIA.

GEAR-CUTTING MACHINE.

1,384,558. Specification of Letters Patent. Patented July 12, 1921.

Application filed November 22, 1917. Serial No. 203,446.

*To all whom it may concern:*

Be it known that I, LEWIS J. EVANS, a citizen of the United States, and a resident of Wilkinsburg, in the county of Allegheny and State of Pennsylvania, have made a new and useful Invention in Gear-Cutting Machines, of which the following is a specification.

This invention relates to gear cutting machines and has for an object to produce a new and improved machine for eliminating inaccuracies in cutting gears.

A further object is to produce a gear cutting machine in which a differential mechanism is employed for compensating for inaccuracies in the driving mechanism of the machine.

A further object is to produce a mechanism for counteracting the inaccuracies by employing two driving worms or screws.

These and other objects are attained by means of a machine embodying the features herein described and illustrated in the drawings accompanying and forming a part hereof.

In the drawings, Figure 1 is a diagrammatic plan view of a table and driving mechanism of a gear cutting machine embodying the features of my invention.

Fig. 2 is a diagrammatic view of a modification of the machine illustrated in Fig. 1.

In cutting or hobbing gear teeth it is customary to mount the work on a rotatable table and to rotate it at a uniform speed as a helical rotating hob or cutter cuts the teeth. The table is ordinarily driven by means of one or more worms which mesh with a master worm wheel secured to the table or to the spindle of the machine. It is essential that both the worm and the worm wheel be accurate as to the pitch and the shape of the teeth, as any inaccuracies in either will occasion an inaccuracy in the work, unless some means are provided for compensating for, or counteracting, these inaccuracies. In carrying out my invention, I preferably employ at least two worms for driving the table and drive them in such a manner that the inaccuracies of one compensate for or counteract the inaccuracies of the other.

In the drawing I have diagrammatically illustrated in plan view the table 5 of a gear cutting machine. As illustrated, the table is driven by a duplex driving mechanism which includes two driving worms 6 and 7 meshing with a worm wheel 8 on the rotatable table. One worm is located on one side and the other on the other side of the table. The worm wheel 8 is formed on or secured to the table 5, and it will be understood that each worm may mesh with a separate gear wheel mounted on the table. I have illustrated such a construction in Fig. 2. The worms 6 and 7 are mounted on parallel shafts 9 and 10, which extend beyond the table 5 and are operatively connected together and driven by two cross shafts 11 and 11' and a differential gearing 17 which operatively connects the shafts. The shafts 11 and 11' are axially alined and a set of bevel gears 12 operatively connect the shaft 9 to the shaft 11, whereas a set of bevel gears 13 operatively connect the shaft 10 to the shaft 11'.

Power is transmitted from an outside source to the cross shafts 11 and 11' by means of change gearings 14, a shaft 15 and a gear 16, which is mounted on the shaft 15 and which meshes with an external gear 18 forming a part of differential gearing 17.

The differential gearing 17 may be of any type, but as illustrated, it consists of the external spur gear 18, inside of which small bevel gears 19 are mounted so as to mesh simultaneously with bevel gears 20 and 21 rigidly mounted on the cross shafts 11 and 11' respectively. With this arrangement one of the cross shafts may get ahead or lag behind the other.

The driving worms 6 and 7 may mesh with the same master worm wheel or a separate worm wheel may be provided for each, as above stated, and illustrated in Fig. 2. In the latter case the two wheels are preferably cut together and are placed one above the other and spaced circumferentially 180° apart in reference to the position in which they were cut. This arrangement causes any inaccuracies of one wheel to counteract or compensate for a similar inaccuracy in the other wheel by reason of the cross shafts 11 and 11' and the differential gear 17. For example, if one worm drags slightly, due to the inaccuracy in the worm wheel or worm, the other worm will be speeded up a corresponding amount due to the action of the differential 17, so that the resulting speed of the table 5 will remain substantially constant. It will, of course, be understood that the variations will be slight and that the differential 17 will tend to divide the error in each case so that the uniform rotation of the table 5 is maintained and gears of maximum accuracy are produced by the machine. The duplex drive illustrated will tend to eliminate errors, whether the driving worms mesh with the same worm wheel or with separate worm wheels.

From the above, it will be apparent that similar portions of the two similar worm gears are relatively displaced circumferentially and that the worms are relatively displaced circumferentially of the worm gears.

While I have described and illustrated but two embodiments of my invention, it will be apparent to those skilled in the art that various changes, modifications, additions and omissions may be made in the apparatus described and illustrated without departing from the spirit and scope of the invention, as set forth by the appended claims.

What I claim is:

1. In a gear cutting machine, a rotatable work holding table, at least two worms for driving said table, driving means for both of said worms, and differential means operatively connecting said worms for allowing equal and opposite variations in speed between the two worms, whereby the inaccuracies of one drive are compensated for by the other drive.

2. In a mechanism for producing uniform rotation, a driven means, at least two driving worms therefor, driving means for the worms, and a differential device connecting said driving means for compensating for inaccuracies in the power transmitting relationship between the driven means and the worms.

3. In a duplex drive for gear cutting machines, two driving worms, driving means therefor, and a differential mechanism connecting said means whereby a variation in speed in one drive causes an equal and opposite variation in speed in the other drive.

4. In a gear hobbing machine, a rotatable work holding table, duplex driving means for rotating the table, a rotatable cross shaft connecting said driving means and transmitting power thereto, and a differential mechanism on said shaft through which power is transmitted to said shaft for reducing errors due to inaccuracies in the driving means.

5. In a gear hobbing machine, a rotatable work holding table, at least two worms for driving said table, a cross shaft for driving both worms, and a differential gearing on said shaft whereby a variation in speed of one worm will cause an equal and opposite variation in speed of the other worm.

6. In a gear hobbing machine, a rotatable table, similar worm gears carried by the table and having similar portions displaced circumferentially, driving worms for the worm gears relatively displaced circumferentially of the worm gears, and differential driving means for the worms.

In testimony whereof I have hereunto subscribed my name this 21st day of November, 1917.

LEWIS J. EVANS.

Witnesses:
C. W. McGhee,
M. B. Gordon.